AS-TRIAZINO[5,6-C]QUINOLINE DERIVATIVES

[75] Inventors: Edit Berényi Née Poldermann; László Pallos; Lujza E. Petöcz; Péter Görög; Zoltán Budai; Enikö Kiszelly; Pál Benko, all of Budapest, Hungary

[73] Assignee: Egyt Gyogyszervegycxzeti Gyar, Budapest, Hungary

[22] Filed: May 1, 1973

[21] Appl. No.: 356,174

[30] Foreign Application Priority Data
May 5, 1972 Hungary.............................. EE 2021

[52] U.S. Cl.......... 260/248 AS, 424/249, 260/288 R
[51] Int. Cl.............................................. C07d 57/34
[58] Field of Search............................. 260/248 AS

[56] References Cited
UNITED STATES PATENTS
3,597,427   8/1971   Lewis et al........................... 260/248

*Primary Examiner*—John M. Ford
*Attorney, Agent, or Firm*—Young & Thompson

[57] ABSTRACT as-Triazino[5,6-c]quinoline derivatives of the general formula (I)

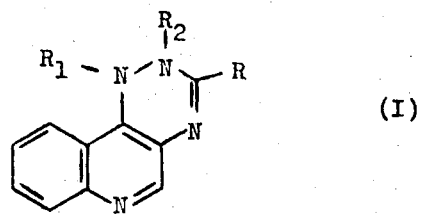

wherein
R represents hydrogen, a $C_{1-4}$ alkyl group or a phenyl group,
$R_1$ and $R_2$ each represent hydrogen or may form together a valence bond are prepared as follows: 4-hydrazino-3-nitroquinoline is reacted with an alkyl orthoformate of the general formula (II)

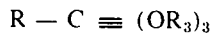

wherein $R_3$ represents a $C_{1-3}$ alkyl group and R has the same meanings as defined above, the thus-obtained alkoxymethylenehydrazino-nitroquinoline of the general formula (III)

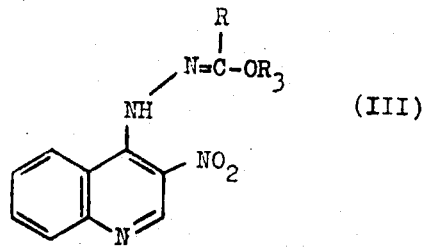

1 Claim, No Drawings

AS-TRIAZINO[5,6-C]QUINOLINE DERIVATIVES

This invention relates to novel as-triazino-[5,6-c]quinolines of the general formula (I) and salts thereof. The new compounds of the invention possess valuable anti-inflammatory and antimicrobial activities.

The compounds of the general formula (I)

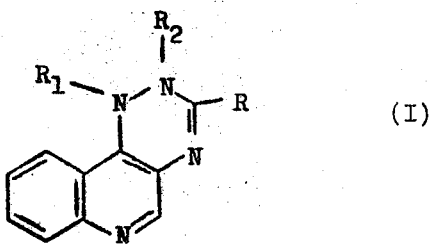

wherein
R represents hydrogen, a $C_{1-4}$ alkyl group or a phenyl group,
$R_1$ and $R_2$ each represent hydrogen or may form together a valence bond
or their salts are prepared as follows: 4-hydrazino-3-nitroquinoline is reacted with an alkyl orthoformate of the general formula (II)

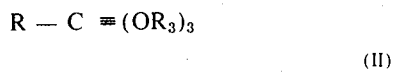

wherein $R_3$ represents a $C_{1-3}$ alkyl group and R has the same meanings as defined above, the thus-obtained alkoxymethylenehydrazino-nitroquinoline of the general formula (III)

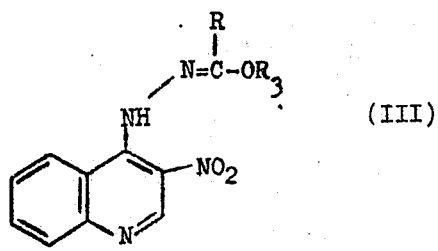

wherein $R_3$ and R each have the same meanings as defined above, is subjected to reductive ring closure, and, if desired, the thus-obtained 1,2-dihydro-as-triazino[5,6-c]quinoline of the general formula (I), wherein R has the same meanings as defined above and $R_1$ and $R_2$ each represent hydrogen, is oxidized into the corresponding as-triazino[5,6-c]quinoline of the general formula (I), wherein R has the same meanings as defined above, and $R_1$ and $R_2$ form together a valence bond. The compounds of the general formula (I) can be converted into their salts, if desired.

The compounds of the invention are novel and possess significant anti-inflammatory and moderate analgesic and antimicrobial activities.

wherein $R_3$ R each have the same meanings as defined above, is subjected to reductive ring closure, and, if desired, the thus-obtained 1,2-dihydro-as-triazino[5,6-c]quinoline of the general fomula (I), wherein R has the same meanings as defined above, and $R_1$ and $R_2$ each represent hydrogen, is oxidized to the corresponding as-triazino[5,6-c]quinoline, wherein R has the same meanings as defined above and $R_1$ and $R_2$ form together a valence bond, and, if desired, any compound of the general formula (I) is converted into its salt.

The process is based on the unexpected discovery that the reaction of 4-hydrazino-3-nitroquinoline with alky orthoformates of the general formula (II) yields solely the appropriate compounds of the general formula (III) without the formation of any hydrazide-type by-products, and the compounds of the general formula (III) are highly liable to ring closure.

4-Hydrazino-3-nitroquinoline is reacted with an alkyl orthoformate of the general formula (II) preferably at the boiling point of the reaction mixture, in the presence of an acid catalyst. The thus-formed alkoxymethylenehydrazino-nitroquinoline is hydrogenated in the presence of a catalyst. The ring closure takes place simultaneously with the reduction, since the amino group generated from the nitro group directly enters into reaction with the highly reactive alkoxymethylenehydrazino group. During this intramolecular ring closure the corresponding 1,2-dihydro-as-triazino[5,6-c]quinoline is formed, which can be oxidized into the appropriate aromatic compound, if desired.

The dihydro compounds are, in general, highly liable to oxidation, accordingly in the majority of the cases oxidation takes place even when the reaction mixture is evaporated in the presence of air. If, however, the appropriate dihydro compound is not so reactive, it is isolated in the form of its salts — preferably as the hydrochloride — and is oxidized in a separate step to the corresponding aromatic as-triazino-[5,6-c]quinoline. The oxidation is carried out in the presence of an oxidizing agent, such as potassium hexacyano ferrate, in an alkaline medium. The easily oxidizable dihydro compounds can be isolated by filtering the reaction mixture in an inert gas atmosphere, and separating the dihydro compound in the form of its salt, preferably as the hydrochloride. The salt formation can be carried out e.g. using ethanolic hydrochloric acid.

The novel compounds of the general formula (I) possess significant anti-inflammatory activity, coupled with moderate analgesic and antimicrobial effects.

The toxicity values of the new compounds have been examined on CFLP mice. The compounds were administered orally in a suspension formed with Tween 80 suspending agent. 20 to 30 ml./kg. doses of the suspension were administered. The results are summarized in Table 1.

Table 1

| Compound | $LD_{50}$ mg./kg. |
|---|---|
| as-triazino[5,6-c]quinoline | 90 |
| 3-phenyl-as-triazino[5,6-c]quinoline | above 3000 |
| 3-phenyl-1,2-dihydro-as-triazino[5,6-c]quinoline HCl | above 3000 |
| Aspyrin | 1500 |
| Indomethacine | 24.3 |
| Phenylbutazon | 1000 |

The anti-inflammatory activity of the new compounds was investigated on rats by the carrageenin-oedema test, using the method of Winter et al. (J. Pharmacol. Exp. Ther. 141, 369 /1963/). Male rats weighing 150 to 180 g. were used as test animals. 0.1 ml. doses of carrageenin-suspension were injected subcutaneously into the hind paws of the animals, and the thus-provoked oedema was measured by plethysmometer. The compounds to be tested were administered orally in the doses as indicated in Table 2. The percentage inhibition was calculated by comparing the measures of oedema of the tested animals to that of the controls.

The results of the above test are summarized in Table 2.

Table 2

| Compound | Dosis mg./kg. | Inhibition % |
|---|---|---|
| as-triazino[5,6-c]quinoline | 0.87 | 24.3 |
| | 1.75 | 32.8 |
| | 3.5 | 43.5 |
| 3-phenyl-as-triazino[5,6-c]-quinoline | 200 | 15.7 |
| | 400 | 20.3 |
| 3-phenyl-1,2-dihydro-as-triazino[5,6-c]quinoline.HCl | 200 | 23.3 |
| | 400 | 31.8 |
| Aspyrin | 180 | 39.0 |
| Phenylbutazon | 30 | 33.0 |
| | 90 | 45.0 |
| Indomethacine | 3 | 30.0 |
| | 9 | 44.0 |

Besides this favourable anti-inflammatory activity, the new compounds exert also a moderate analgesic effect.

The compounds of the invention can be transformed to pharmaceutical products by admixing them with carriers and/or auxiliary agents usable in the pharmaceutical industry. The pharmaceutical preparations may contain other biologically active and/or synergistic agents besides the compounds of the general formula (I).

The invention is elucidated in detail by the aid of the following non-limiting Examples. 4-Hydrazino-3-nitroquinoline, the starting compound of the process of the invention, has been prepared as described in J. Chem. Soc. (C), 1969, 1758.

EXAMPLE 1

4-β-Ethoxymethylenehydrazino-3-nitroquinoline 20.4 g. (0.1 mol.) of 4-hydrazino-3-nitroquinoline and 0.2 g. of p-toluenesulfonic acid are suspended in 100 ml. of ethyl orthoformate, and the reaction mixture is kept at 120° to 130°C for 4 hours. The ethanol formed in the reaction is distilled off, and the residue is cooled. 22.3 g. (86 %) of 4-β-ethoxymethylenehydrazino-3-nitroquinoline separate in the form of yellow crystals. M.p.: 150°–152°C (after recrystallization from benzene.

Similarly can be prepared the following compounds:
4-β-ethoxymethyl-methylenehydrazino-3-nitroquinoline; m.p.: 131°–133°C,
4-β-ethoxyethyl-methylenehydrazino-3-nitroquinoline; m.p.: 170°–172°C,
4-β-ethoxyphenyl-methylenehydrazino-3-nitroquinoline; m.p.: 127°–128°C.

EXAMPLE 2 as-Triazino[5,6-c]quinoline 13.0 g. (0.05 mol.) of 4-β-ethoxymethylenehydrazino-3-nitroquinoline are hydrogenated in ethanol in the presence of palladium catalyst. When the hydrogen uptake ceases, the reaction mixture is evaporated. 7.7 g. (85 %) of as-triazino[5,6-c]quinoline are obtained in the form of yellow crystals melting at 162°–164°C.

Similarly can be prepared the following compounds:
3-methyl-as-triazino[5,6-c]quinoline; m.p.: 137°–138°C, 3-ethyl-as-triazino[5,6-c]quinoline; m.p.: 106°–108°C,
3-phenyl-as-triazino[5,6-c]quinoline; m.p.: 203°–204°C.

EXAMPLE 3

1,2-Dihydro-as-triazino[5,6-c]quinoline hydrochloride 26.0 g. (0.1 mol.) of 4-β-ethoxymethylenehydrazino-3-nitroquinoline are hydrogenated in ethanol in the presence of palladium catalyst. When the hydrogen uptake ceases, the reaction mixture is filtered to remove the catalyst, and 200 ml. of 15% ethanolic hydrochloric acid are added to the filtrate. The solution is evaporated to yield 21.0 g. (95.5 %) of 1,2-dihydro-as-triazino[5,6-c]quinoline hydrochloride; m.p.: 285°–**°C.

Similarly can be prepared the 3-phenyl-1,2-dihydro-as-triazino[5,6-c]quinoline hydrochloride; m.p.: 297°– °C.

EXAMPLE 4 as-Triazino[5,6-c]quinoline 11.0 g. (0.05 mol.) of 1,2-dihydro-as-triazino[5,6-c]quinoline hydrochloride are added to 100 ml. of 36% potassium ferricyanide solution at 0°C, the pH of said solution being adjusted previously to 9 with concentrated ammonium hydroxide. 8.2 g. (90 %) of as-triazino[5,6-c]quinoline are obtained. The product is identical to that obtained in Example 2.

What we claim is:

1. An as-triazino[5,6-c] qunoline derivative selected from the group consisting of a compound of the formula

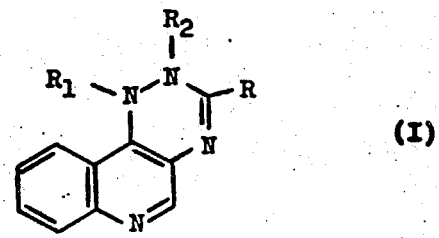

(I)

in which R is a member selected from the group consisting of hydrogen and $C_{1-4}$ alkyl, and $R_1$ and $R_2$ are each hydrogen or may form together a valence bond, and a pharmaceutically acceptable acid addition salt thereof.